Aug. 13, 1968     R. E. AYRES     3,397,266
METHOD AND APPARATUS FOR THE INJECTION MOLDING
OF ELONGATE CYLINDRICAL ARTICLES
Filed Oct. 31, 1966

INVENTOR.
Ralph E. Ayres
BY
AGENT

United States Patent Office 3,397,266
Patented Aug. 13, 1968

3,397,266
METHOD AND APPARATUS FOR THE INJECTION MOLDING OF ELONGATE CYLINDRICAL ARTICLES
Ralph E. Ayres, Midland, Mich., assignor to The Dow Chemical Company, Midland, Mich., a corporation of Delaware
Filed Oct. 31, 1966, Ser. No. 590,712
4 Claims. (Cl. 264—328)

ABSTRACT OF THE DISCLOSURE

In the injection molding of cylindrical closed end articles such as tumblers, mandrel deflection during the molding operation is significantly reduced by injecting plastic on the axis of generation of the tumbler at the bottom and causing the mandrel and mold to define a restriction at the base of the cavity so that the material being injected exerts a radially outward pressure on the mandrel which overcomes to a significant degree tendency of the mandrel to deflect.

---

This invention relates to an improved method and apparatus for the injection molding of elongate thermoplastic articles, and more particularly relates to an improved method and apparatus for the preparation of elongate plastic articles having an open end and a closed end.

Frequently, it is desired to prepare elongate objects of circular cross-section having an open end and a closed end by the process of injection molding. Beneficially, deep tumblers and parisons which are later blown into bottles are often prepared in such a manner. When exceptionally deep articles are prepared having a small diameter to length ratio, difficulty is often encountered with deflection of the mandrel in the mold of the injection molding machine and the resultant article has an undesired variation in wall thickness. Beneficially, in order to minimize deflection of the mandrel during the molding process, it is desirable to introduce the molten plastic material at a generally central location into the mold cavity which corresponds to the closed end of the fabricated article. By symmetrically introducing the molten material along the axis of an elongate circular cavity, deflection of the mandrel is minimized. However, due to minor irregularities, considerable deflection oftentimes occurs. Such deflection is undesirable when articles as tumblers and the like are manufactured as non-uniform wall thickness is generally esthetically unappealing and maximum strength for a given weight of plastic material is not obtained. The dissymmetry becomes particularly serious when preparing injection molded parisons for bottle blowing. When the parison is heat plastified and subsequently blown oftentimes the dissymmetry of the original parison is increased in the finished bottle or container as the thinner portions of the parison oftentimes are more uniformly heated than the heavier portions and stretch to a greater extent during blowing.

It would be desirable if there were available a method and apparatus for the injection molding of elongate hollow plastic articles having one enclosed end.

It would also be beneficial if there were available an apparatus for the injection molding of elongate hollow articles which has a generally self-centering mandrel.

It would also be beneficial if there were available a method and apparatus for the preparation of elongate hollow articles of generally circular cross-sectional configuration.

These features and other advantages in accordance with the method of the present invention are achieved in a method for the injection molding of an elongate body having a generally circular cross-section, the method comprising providing means defining a molding cavity generally conforming to the desired external configuration of the desired elongate body, a mandrel disposed generally symmetrically within the cavity generally conforming to the desired internal configuration of the body, the improvement which comprises causing heat plastified synthetic resinous material to flow into the cavity at a location remote from the point of support of the mandrel, causing the plastified material to flow generally radially outwardly into a generally annular restrictive zone, causing the material to exert an outward radial pressure on the mandrel, thereby filling the mold cavity, subsequently cooling the heat plastified material below the thermoplastic temperature and removing a shaped article from the cavity defining means.

Also contemplated within the scope of the present invention is an improved mold for the formation of elongate synthetic resinous thermoplastic bodies by an injection molding process, the improved mold comprising a mold body defining an elongate cavity, the elongate cavity having a central axis, the cavity being generally symmetrical about the axis, a passageway within the body communicating with the cavity and being positioned generally on the axis of the cavity, the passageway providing communication between the cavity and a source of heat plastified synthetic resinous material, a mandrel having a first end and a second end, the first end of the mandrel affixed to a mandrel support adapted to mate with the mold in sealing engagement therewith and position the mandrel generally coaxially with the axis of the cavity, the mandrel and the mold defining a generally symmetrical space therebetween, the second end of the mandrel defining a circumferentially disposed land, the land having an inwardly facing surface, the mold defining a generally outwardly facing surface adjacent to the second end of the mandrel and generally symmetrically disposed about the passageway, the outwardly facing surface of the mold and the inwardly facing surface of the mandrel defining a restriction which is narrower than the space between the mandrel and the mold in adjacent areas.

Further features and advantages of the present invention will become more apparent from the following specification when taken in connection with the drawing wherein.

Figure 1:
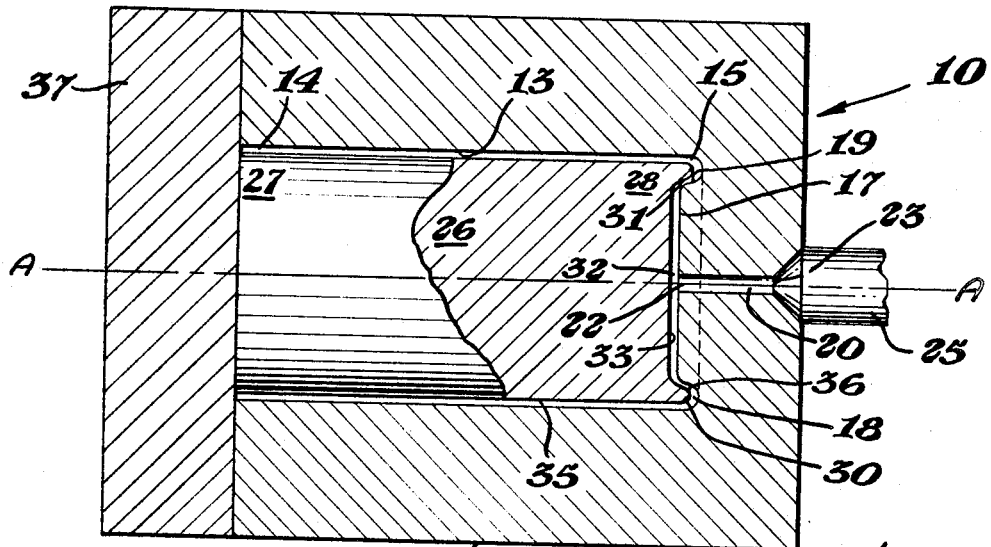
FIGURE 1 is a partly in section schematic representation of a mold in accordance with the present invention.

In FIGURE 1 there is depicted a mold in accordance with the present invention generally designated by the reference numeral 10. The mold 10 comprises a body portion 11. The body portion 11 defines an internal cavity 13. The cavity 13 has a first or open end 14 and a second or generally closed end 15. The housing 11 adjacent the second end 15 of the cavity 13 defines a raised terminal portion 17 which in combination with the wall of the cavity 15 defines a generally annular recess 18 disposed at the second end 15 of the cavity 13. The raised portion 17 defines a generally outwardly facing annular wall portion 19. The housing 11 defines a passageway 20 having a discharge end 22 and an inlet end 23 which provides communication between a central portion of the raised portion 17 and a space external to the cavity. An injection nozzle 25 is in operative engagement with the inlet end 23 of the passageway 20. The cavity 13 has a generally longitudinal axis A. The passageway 20 is generally coaxially disposed with respect to the axis A. A mandrel 26 is disposed within the cavity 13. The mandrel 26 has a first end 27 and a second end 28. The second end 28 has a circumferential terminal annular land 30 having an inwardly facing annular surface 31 oppositely disposed to the surface 19 of the raised portion 17 of the housing 11. The land 30 surrounds a recess 32 defined by the annular surface 31 and a terminal face 33 of the mandrel 26. The mandrel 26 and the housing 11 define a container-shaped cavity 35 adapted to receive synthetic resinous material. The cavity 35 has a region of restriction 36 lying between the faces 19 and 31. Thus, the cavity 35 has an elongated tubular configuration having one closed end, the closed end being at the second end 15 of the cavity 13. The mandrel 26 is affixed to the mandrel support 37. The mandrel support 37 mates with the housing 11 to provide a closed cavity with access only through the passageway 20.

Figure 2:
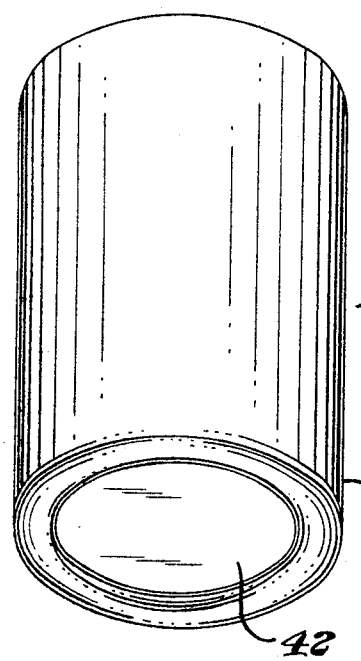
FIGURE 2 depicts a view of a container prepared employing the method and apparatus of the present invention.

In FIGURE 2 there is depicted a container generally designated by the reference numeral 40. The container 40 has a wide wall portion 41 of generally circular cross-section and a closed bottom 42. The container 40 is obtained from the mold 10 of FIGURE 1.

Figure 3:
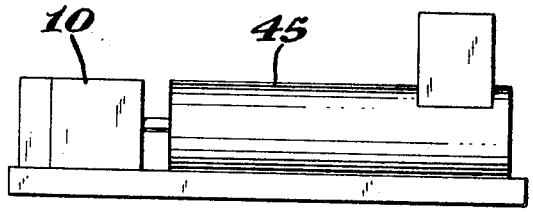
FIGURE 3 is a schematic representation of a mold in accordance with the present invention in cooperative combination with an injection molding machine.

In FIGURE 3 there is schematically illustrated a mold 10 in operative combination with an injection molding machine 45.

In operation of the apparatus of the present invention in practice of the method of the invention, heat plastified synthetic resinous material is supplied from the injection nozzle 25 to the first end 23 of the passageway 20. The material is discharged from the discharge end 22 into the space 32 under a pressure appropriate for the thermoplastic material employed. The recess 32 is filled with synthetic resinous material which passes through the restriction 36 and flows toward the first end 14 of the cavity. The hydraulic forces of the synthetic resin in heat plastified form passing through the restriction 36 tend to center the mandrel and maintain it in a generally centered position during the injection of the melt and subsequent cooling.

By way of further illustration, a mold generally as illustrated in FIGURE 1 with a cavity 9.5 inches long, having a length to diameter ratio of 4.7 is employed in an injection molding machine with polystyrene. The section corresponding to the restriction 36 has a width of about 0.020 inch and is about 1/16 inch in length. The wall spacing of the main body of the container such as is indicated by the reference numeral 35 in FIGURE 1 is about 0.050 inch. The resultant molding has a wall thickness variation of 0.026 inch. For purposes of comparison, the land 30 is removed and the second end of the mandrel finished to a generally flat and then hemispherical configuration. In molding under like conditions, the thickness of the wall varies from 0.020 inch to 0.080 inch and the mandrel deflection is about 0.030 inch.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method of injection molding of an elongate body having a generally circular cross-section, the method comprising
   providing means defining a molding cavity generally conforming to the desired external configuration of the desired elongate body, and
   a mandrel capable of deflection under molding conditions, the mandrel disposed generally symmetrically within the cavity generally conforming to the desired internal configuration of the body, the improvement which comprises
   forcing a heat plastified synthetic resinous material to flow into the cavity at a location remote from the point of support of the mandrel, causing the heat plastified material to flow generally radially outwardly through a generally annular restrictive region, causing the material to exert a radially outward pressure on the mandrel and thereby filling the mold cavity, whereby the hydraulic forces of the material passing through the restrictive region tend to center the mandrel in the cavity, subsequently cooling the heat plastified material below the thermoplastic temperature and removing a shaped article from the cavity defining means.

2. The method of claim 1 wherein the heat plastified synthetic resinous material is introduced to the cavity in a direction generally co-linear with the axis of the cavity and directed toward the means supporting the mandrel.

3. In a mold for the formation of elongate synthetic resinous thermoplastic bodies by an injection molding process, the improved mold comprising
   a mold body defining
   an elongate cavity, the elongate cavity having
   a central axis, the cavity being generally symmetrical about the axis,
   a passageway within the mold body communicating with the cavity and being positioned generally on the axis of the cavity, the passageway providing communication between the cavity and a source of heat plastified synthetic resinous material,
   a mandrel capable of deflection under molding conditions, the mandrel having a first end and a second end, the first end of the mandrel adapted to mate with the mold in sealing engagement therewith and position the mandrel generally coaxially with the axis of the cavity, the mandrel and the mold defining a generally symmetrical space therebetween, the improvement which comprises the second end of the mandrel defining
   a circumferentially disposed land, the land having
   an inwardly facing surface, the mold defining
   a generally outwardly facing surface adjacent to the second end of the mandrel and generally symmetrically disposed about the passageway, the outwardly facing surface of the mold and the inwardly facing surface of the mandrel defining
   a symmetrical annular space which is narrower than than the space between the mandrel and the mold in adjacent areas, whereby the hydraulic forces exerted by material passing by the inwardly facing surface of the mandrel tend to center the mandrel in the cavity.

4. In an improved mold for the formation of elongate synthetic resinous thermoplastic bodies by an injection molding process, the improved mold comprising
   a mold body defining
   an elongate cavity having a length of about 9.5 inches and a length to diameter ratio of about 4.7, the elongate cavity having
   a central axis, the cavity being generally symmetrical about the axis,
   a passageway within the mold body communicating with the cavity and being positioned generally on the axis of the cavity, the passageway providing communication between the cavity and a source of heat plastified synthetic resinous material,
   a mandrel having
   a first end and
   a second end, the first end of the mandrel adapted to mate with the mold in sealing engagement therewith and position the mandrel generally coaxially with the axis of the cavity, the mandrel and the mold defining a generally symmetrical space therebetween about 0.050 inch, the second end of the mandrel defining a circumferentially disposed land, the land having an inwardly facing surface, the mold defining a generally outwardly facing surface adjacent the second end of the mandrel and generally symmetrically disposed about the passageway, the outwardly facing surface of the mold and the inwardly facing surface of the mandrel defining a space about 0.20 inch in thickness and about $\frac{1}{16}$ inch in length which is narrower than the space between the mandrel and the mold in adjacent areas.

References Cited

UNITED STATES PATENTS

| | | | |
|---|---|---|---|
| 3,018,519 | 1/1962 | Morin | 264—328 |
| 3,064,310 | 11/1962 | Cooprider | 264—328 |
| 3,093,865 | 6/1962 | Peters | 264—328 |
| 2,558,026 | 6/1951 | Wilson | 264—328 |
| 3,107,234 | 10/1963 | Stewart | 264—328 |

ROBERT F. WHITE, *Primary Examiner.*

J. H. SILBAUGH, *Assistant Examiner.*